United States Patent
Gillet

(10) Patent No.: US 9,815,095 B2
(45) Date of Patent: Nov. 14, 2017

(54) INJECTION DEVICE COMPRISING A CENTRAL ROD MOVABLE IN A CLEANING POSITION

(71) Applicant: DISCMA AG, Hunenberg (CH)

(72) Inventor: Denis Gillet, Octeville sur Mer (FR)

(73) Assignee: DISCMA AG, Hunenberg (CH)

( * ) Notice: Subject to any disclaimer, the term of this patent is extended or adjusted under 35 U.S.C. 154(b) by 163 days.

(21) Appl. No.: 14/894,761

(22) PCT Filed: May 28, 2014

(86) PCT No.: PCT/EP2014/061167
§ 371 (c)(1),
(2) Date: Nov. 30, 2015

(87) PCT Pub. No.: WO2014/191515
PCT Pub. Date: Dec. 4, 2014

(65) Prior Publication Data
US 2016/0107366 A1    Apr. 21, 2016

(30) Foreign Application Priority Data

May 30, 2013    (EP) .................................... 13305716

(51) Int. Cl.
| | |
|---|---|
| *B08B 9/027* | (2006.01) |
| *B29C 49/42* | (2006.01) |
| *B29C 49/46* | (2006.01) |
| *B29C 49/58* | (2006.01) |
| *B08B 9/032* | (2006.01) |

(Continued)

(52) U.S. Cl.
CPC ............ *B08B 9/027* (2013.01); *B08B 9/0325* (2013.01); *B29C 49/28* (2013.01); *B29C 49/4273* (2013.01); *B29C 49/46* (2013.01); *B29C 49/58* (2013.01); *B29C 49/12* (2013.01); *B29C 49/4289* (2013.01); *B29C 2049/1295* (2013.01); *B29C 2049/465* (2013.01); *B29C 2049/4694* (2013.01); *B29C 2049/5803* (2013.01); *B29C 2049/5817* (2013.01); *B29L 2031/7158* (2013.01)

(58) Field of Classification Search
CPC ....... B08B 9/0325; B08B 9/027; B29C 49/12; B29C 49/4273; B29C 49/4289; B29C 49/46; B29C 49/48; B29C 49/58; B29C 2049/1295; B29C 2049/465; B29C 2049/4694; B29C 2049/5803; B29C 2049/5817; B29L 2031/7158
See application file for complete search history.

(56) References Cited

U.S. PATENT DOCUMENTS

| | | |
|---|---|---|
| 2007/0074783 A1 | 4/2007 | Stocchi |
| 2012/0164258 A1 | 6/2012 | Dordoni |
| 2013/0105043 A1 | 5/2013 | Krulitsch |

*Primary Examiner* — Saeed T Chaudhry
(74) *Attorney, Agent, or Firm* — Eric J. Sosenko; Jonathan P. O'Brien; Honigman Miller Schwartz and Cohn LLP

(57) ABSTRACT

An injection device having an inlet for receiving a fluid, an outlet for injecting the fluid and a chamber therebetween. A control rod is provided in the chamber and includes a duct extending through said control rod. A central rod extends in the duct and is movable between a retracted position and an active position. The central rod and the duct being arranged to prevent fluidic communication between the duct and the chamber when the central rod moves between its retracted and active positions. The central rod and the control rod are further movable relative to each other into a cleaning position, in which the duct is placed in fluidic communication with the chamber.

13 Claims, 6 Drawing Sheets

(51) Int. Cl.
*B29C 49/28* (2006.01)
*B29C 49/12* (2006.01)
*B29L 31/00* (2006.01)

INJECTION DEVICE COMPRISING A CENTRAL ROD MOVABLE IN A CLEANING POSITION

CROSS-REFERENCE TO RELATED APPLICATIONS

This application is the U.S. national phase of PCT Application No. PCT/EP2014/061167 filed on May 28, 2014, which claims priority to EP13305716.6 filed on May 30, 2013, the disclosures of which are incorporated in their entirety by reference herein.

TECHNICAL FIELD OF THE INVENTION

An injection device for injecting a liquid at an outlet of the device, of the type comprising:
- an inlet for receiving the fluid, an outlet for injecting the fluid and a chamber extending between the inlet and the outlet,
- a hollow control rod extending in the chamber and being movable between a sealing position, wherein the control rod closes the outlet, and an injection position wherein the control rod is arranged away from the outlet, the hollow control rod defining a duct extending through the control rod,
- a central rod extending in the duct of the control rod and movable between a retracted position wherein the central rod is at least in part retracted inside the duct and an active position, wherein the central rod protrudes from the control rod and extends through the outlet, the central rod and the duct being arranged to prevent fluidic communication between the duct and the chamber when the central rod moves between its retracted and active positions.

The invention also relates to a method for cleaning such an injection device.

The injection device according to the invention can be used, for example, in forming a container from a preform by injecting a forming liquid inside the preform such that the preform is deformed and acquires the shape of the container.

BACKGROUND

In this technical field of forming containers, hygiene is a very important issue in order to prevent any risk of contamination of the content of the containers, for example bottles with products that are to be ingested by consumers or applied on the skin of a consumer. In particular, any part in contact with the product intended to fill the containers has to work in an aseptic environment and preferably be isolated from the exterior atmosphere.

In a container forming device, a central rod, such as a stretch rod is used to assist in the deformation of the preform, the stretch rod pushing the bottom of the preform in order to deform the preform in an axial direction, the radial deformation being ensured at the same time by injecting a compressible gaseous fluid or an incompressible liquid in the preform.

The stretch rod is therefore plunged in the preform and might contaminate it if not properly working in a contamination free environment and regularly being cleaned. WO-2011/030183 discloses a device for blowing and stretching a plastic preform, wherein the stretch rod is housed in a tube to be isolated from the exterior atmosphere. The housing is separated and isolated from the chamber, or injection nozzle, by fixed sealing means, meaning that, for properly cleaning the injection device and its stretch rod, the chamber and the housing have to be cleaned separately via two separate cleaning paths for the cleaning products, which complicates the injection device. Furthermore, parts of the injection device remain difficult to clean, in particular around the fixed sealing means, without having to dismantle the injection device.

One of the aims of the invention is to simplify the cleaning of an injection device and guarantying a proper cleaning of all its components via a single cleaning path and without having to dismantle the injection device.

SUMMARY OF THE INVENTION

To this end, the invention relates to an injection device of the afore-mentioned type, wherein the central rod and the control rod are further movable relative to each other into a cleaning position, wherein the duct is placed in fluidic communication with the chamber, such that the fluid flowing in the chamber via the inlet is able to flow inside the duct and around the central rod.

When positioning the central rod in its cleaning position, the chamber is placed in fluidic communication with the duct containing the central rod. Therefore, it is possible to clean the chamber and the duct, and thus the central rod, in one single cleaning step, by simply replacing the liquid to be injected by cleaning products, without having parts remaining inaccessible to the cleaning products. Therefore, the injection device can be cleaned easily, without having to dismantle the device or stop the machine in which the injection device is used. The central rod can be used for various purposes or functions. When the injection device is part of a container forming machine, the central rod could be a stretch rod designed for longitudinally stretching a preform of the container. When the injection device is part of a container filling machine, the central rod could be used to adjust the level of the liquid remaining into the container when the injection device is removed from the container.

According to other features of the injection device according to the invention:
- the central rod is in liquid tight contact with the duct in at least one sealing area when the central rod moves between its retracted and active positions, the central rod being removed from the liquid tight contact when it is placed in cleaning position;
- the duct has at least one first diameter in the sealing area, the first diameter being substantially equal to the diameter of the part of the central rod extending in the sealing area between the retracted and active positions, and at least one second diameter outside the sealing area, the second diameter being greater than the diameter of the part of the central rod; and
- the duct comprises at least one sealing element extending against the wall of the duct in the sealing area.

According to a particular embodiment of the injection device, the duct comprises a lower opening arranged at one end of the control rod, the lower opening being closed by the central rod in the retracted and in the active positions and being opened by the central rod in the cleaning position, the sealing area extending in the vicinity of the lower opening.

According to this embodiment, the sealing area between the central rod and the duct formed in the control rod extends near the outlet of the injection device. When this embodiment is used for injecting liquid in a container, the injection device provides with a reduced excess volume of liquid extending between the end of the neck of the container, the outlet of the injection device and the sealing area. That embodiment is particularly interesting when the injection device is part of a container hydro-forming station. By reducing the excess volume, it is possible to limit the dripping of liquid occurring when the injection device is removed from the formed container.

According to other features of the injection device according to the invention:
- the fluid from the chamber penetrates in the duct via its lower opening when the central rod is placed in its cleaning position;
- the duct further comprises an upper opening arranged at the end of the control rod opposite the lower opening, the duct further comprising an opening in fluidic communication with the chamber placed above the lower opening of the duct, the fluid flowing in the chamber via the upper opening of the duct and through the opening of the duct placing the duct in fluidic communication with the chamber;
- the duct comprises at least one guiding portion arranged for maintaining the central rod substantially aligned on the axis of the duct; and
- the central rod comprises at least one part having a diameter substantially equal to the diameter of the duct in the guiding portion, the part extending at least in the guiding portion when the central rod moves between its retracted and active positions, the central rod further comprising at least one other part having a diameter inferior to diameter of guiding portion, the other part extending at least in the guiding area when the central rod is in its cleaning position.

According to a particular feature of the injection device according the invention, the upper part of the central rod is enclosed inside a housing, the interior of the housing being isolated from the exterior atmosphere.

By placing the upper part of the control rod inside a housing, it is possible to isolate the central rod from the exterior atmosphere and thereby to reduce the risks of contamination of the central rod. The housing remains, however, accessible for the cleaning products when the central rod is placed in its cleaning position, thereby allowing proper cleaning of the whole central rod.

According to another feature of the injection device according to the invention, the central rod comprises a first magnet arrangement, the housing comprising a second magnet arrangement magnetically coupled to the first magnet arrangement, the second magnet arrangement extending on the exterior of the housing and being arranged to move the first magnet arrangement and hence the central rod at least between its retracted and active positions.

The invention also relates to a station for forming a container from a preform, by injecting a liquid in the preform in order to shape the preform into a container, the station comprising an injection device arranged to inject the liquid in the preform, wherein the injection device is as described above.

The invention also relates to a method for cleaning an injection device as described above, comprising the following steps:
- placing the inlet of the injection device in fluidic communication with a source of cleaning products and placing the outlet in fluidic communication with means for collecting the cleaning products,
- placing the control rod in its injection position,
- injecting the cleaning products in the chamber via the inlet, the cleaning products being evacuated via the outlet, wherein when the central rod is placed in its cleaning position, such that the cleaning products injected via the inlet are able to flow in the entire duct of the control rod and around the central rod.

By placing the central rod in its cleaning position, it is possible to completely clean the injection device in a single step of injection of the cleaning products through the inlet. The cleaning of the injection device is therefore very simple and can be performed in a very short time. Such a method can be used in a machine for forming containers implementing injection devices according to the invention. This provides the machine with a simpler, a more efficient, and a faster way to clean the stretch rod as it can use the same fluid inlet for container forming phase and for the cleaning phase.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
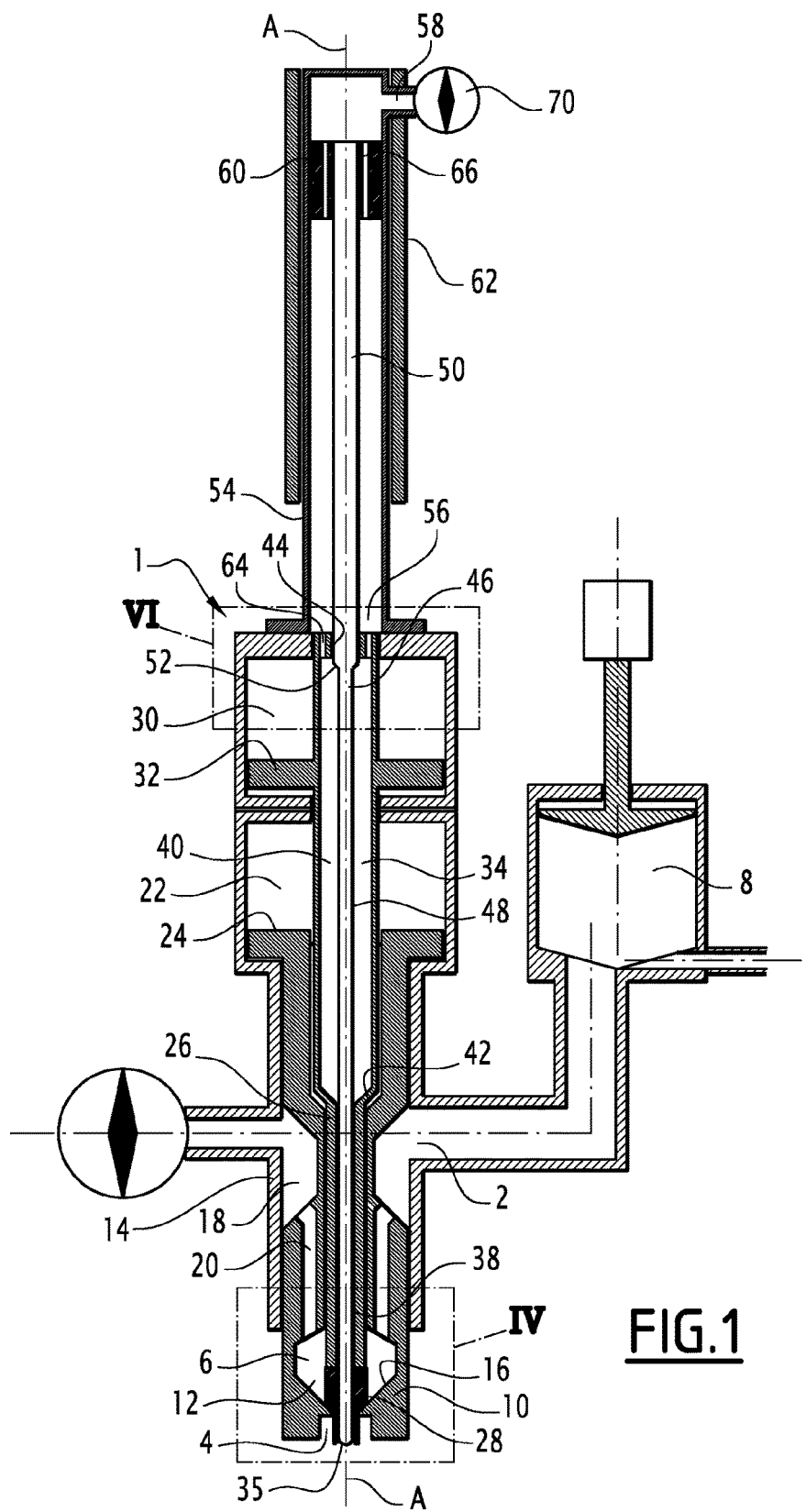
FIG. 1 is a diagrammatical axial cross-section view of an injection device according to a first embodiment of the invention, the control rod being in sealing position and the stretch rod being in retracted position.

In the following description, the terms "upper" and "lower" are defined relative to axis A, which corresponds to the axis of a container to be produced and which extends substantially vertically when the container is placed on its bottom.

Referring to FIGS. 1, 2 and 4 to 7, there is described an injection device 1 according to a first embodiment of the invention, intended to be used in a machine for forming containers, such as plastics bottles and similar, from preforms using liquid products, such as water or carbonated water based drinks or other products. Such machines, known as hydro forming machines, are known per se and will not be described in details here.

The injection device 1 comprises an inlet 2, an outlet 4 and a chamber 6 extending between the inlet 2 and the outlet 4 and placing the inlet 2 in fluidic communication with the outlet 4.

The inlet 2 is placed in fluidic communication with an incompressible liquid source (not shown), for example a water reservoir, via injection means 8 adapted for transferring the liquid from the liquid source to the inlet 2, and appropriate tubing extending between the inlet 2, the injection means 8 and the liquid source.

According to the embodiment shown in the figures, the injection means 8 are formed by a piston. However, the injection means could also be formed by other appropriate means, such as a pump.

The outlet 4 is adapted to be placed in liquid tight fluidic communication with the inner volume of a preform (not shown). By liquid tight fluidic communication, it is meant that when the outlet 4 is in fluidic communication with the inner volume of the preform, the liquid flows only in the inner volume of the preform and not outside the preform. The outlet 4 is for example formed by a movable injection nozzle 10, also forming a movable part 12 of the chamber 6. The injection nozzle 10 is mounted in a casing 14 and is movable relative to the casing 14 in translation along axis A between a retracted position (not shown) and an active position. In the retracted position, the injection nozzle 10 leaves room under the injection device 1 to position a preform under the injection nozzle 10. In the active position, the injection nozzle 10 is placed against the neck of a preform with a liquid tight contact between the injection nozzle 10 and the top sealing surface of the neck of the preform, such that the opening of the injection nozzle 10, forming the outlet 4, is in fluidic communication with the inner volume of the preform. The injection nozzle 10 for example comprises a pyramidal portion or a conical portion 16 adjacent to the outlet 4 and forming part of the movable part 12 of the chamber 6, the diameter of the injection nozzle 10 reducing progressively until it becomes equal to the diameter of the outlet 4 in the conical portion.

The chamber 6 is formed by the movable part 12 formed in the injection nozzle 10 and by a fixed part 18 formed by the casing 14. The casing 14 also forms the inlet 2 of the injection device 1 such that the inlet 2 opens in the fixed part 18 of the chamber 6. The chamber 6 further comprises at least one channel 20, or duct, formed in the injection nozzle 10 and placing the fixed part 18 of the chamber 6 in fluidic communication with the movable part 12 of the chamber 6.

The casing 14 further comprises a first upper compartment 22 arranged to receive actuation means for moving the injection nozzle 10. The actuation means are for example pneumatic actuation means and for example comprise a piston 24, attached to the injection nozzle 10 and hermetically separating the first upper compartment 22 into an upper part and into a lower part, each able to be filled with air. For moving the injection nozzle 10 between its retracted position and its active position, air is injected in the upper part of the first upper compartment 22 in order to increase the pressure in the upper part and to move the piston 24 such that the volume of the upper part increases, while to volume of the lower part decreases. Conversely, for moving the injection nozzle 10 between its active position and its retracted position, air is injected in the lower part of the first upper compartment 22 in order to increase the pressure in the lower part and to move the piston 24 such that the volume of the lower part increases, while to volume of the upper part decreases. The inner volume of the chamber 6 is hermetically isolated from the first upper compartment 22 by appropriate sealing means.

Figure 4:
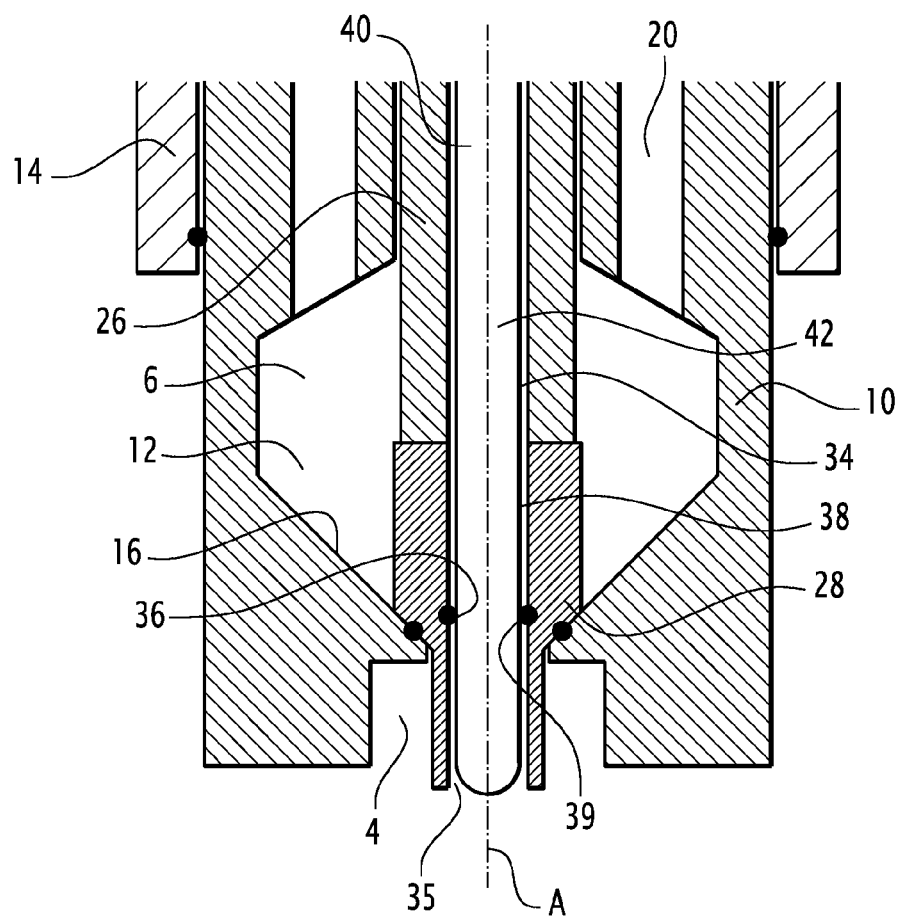
FIG. 4 is an enhanced view of area IV of FIG. 1.

The injection device further comprises a hollow control rod 26 extending in the chamber 20 along axis A. The hollow control rod 26 comprises at its lower end, extending in the movable part 12 of the chamber 6, a sealing ring 28. The sealing ring 28 has a shape which is complementary to the shape of part of the conical portion 16 of the injection nozzle 10, such that, when the sealing ring 28 is applied against the wall of the conical portion 16, the sealing ring 28 closes hermetically the chamber 6 and prevents liquid from flowing through the outlet 4, as shown in FIGS. 1 and 4. The hollow control rod 26 is movable in translation along axis A in the casing 14 between an injecting position, shown in FIGS. 2 and 5, wherein the sealing ring 28 is spaced from the wall of the conical portion 16 and wherein the outlet 4 is in fluidic communication with the inlet 2 via the chamber 6, and a sealing position, shown in FIGS. 1 and 4, wherein the sealing ring 28 is applied against the wall of the conical portion 16 and hermetically closes the chamber 6.

The casing 14 further comprises a second upper compartment 30 arranged to receive actuation means for moving the control rod 26. The actuation means are for example pneumatic actuation means and for example comprise a piston 32, attached to the control rod 26 and hermetically separating the second upper compartment 30 into an upper part and into a lower part, each able to be filled with air. For moving the control rod 26 between its injecting position and its sealing position, air is injected in the upper part of the second upper compartment 30 in order to increase the pressure in the upper part and to move the piston 32 such that the volume of the upper part increases, while to volume of the lower part decreases. Conversely, for moving the control rod 26 between its sealing position and its injecting position, air is injected in the lower part of the second upper compartment 30 in order to increase the pressure in the lower part and to move the piston 32 such that the volume of the lower part increases, while to volume of the upper part decreases. The inner volume of the chamber 6 is hermetically isolated from the second upper compartment 30 by appropriate sealing means.

Figure 5:
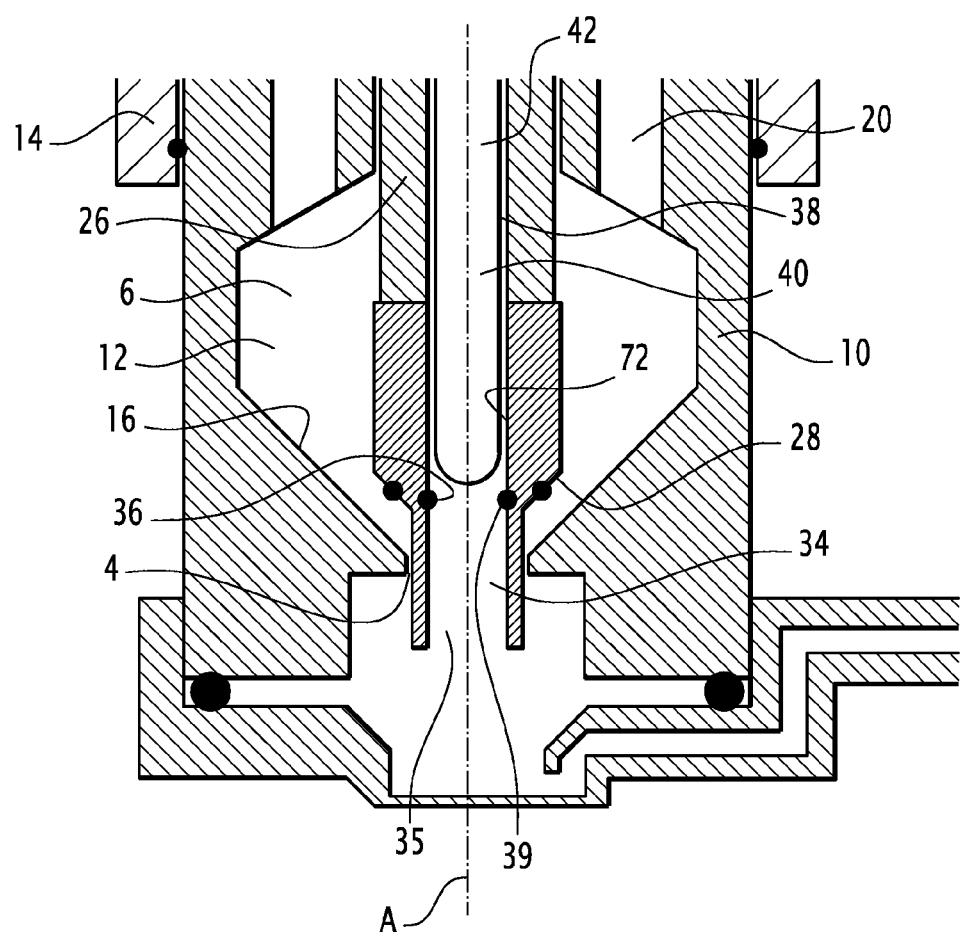
FIG. 5 is an enhanced view of area V of FIG. 2.

The hollow control rod 26 defines an inner cylindrical duct 34 extending substantially along axis A and opened at both ends of the control rod 26. In particular, the duct 34 comprises a lower opening 35, which extends in the vicinity of the outlet 4, in the sealing position as well as in the injection position of the control rod 26. The duct 34 further comprises an upper opening 37 (visible in FIGS. 6 and 7), opposite the lower opening 35. As shown in FIGS. 4 and 5, the duct 34 comprises at least two portions, respectively first portion, or sealing area 36, having a first diameter, and second portion 38, having a second diameter, greater than the first diameter.

According to the embodiment shown in the figures, the first diameter is formed by a sealing element 39 extending on the wall of the duct 34 and reducing the diameter of the duct, while the second diameter is formed by the wall of the duct, without a sealing element. The sealing element 39 is for example formed by an annular seal, made in rubber or other. The sealing area 36 extends in the vicinity of the lower opening 35, such that the distance between the lower opening 35 and the sealing area 36 is reduced to a minimum. The sealing area 36 extends punctually in the duct 34, meaning that the height of the sealing area, defined according to axis A, is largely inferior to the height of the second portion 38 and is reduced to a minimum.

According to the embodiment shown in figures, the duct 34 further comprises a third portion 40, having a third diameter greater than the second diameter, and extending above the second portion 38. The third portion is connected to the second portion by a truncated cone portion 42, wherein the diameter of the duct 34 is linearly reduced from the third diameter to the second diameter in the downward direction. According to variants, the duct 34 could comprise further portions having other diameters. In particular, the duct 34 further comprises at least one guiding portion 44, extending in the vicinity of the upper opening 37 of the duct and/or in the third portion 40 of the duct, defining a passage centered on the axis A having a diameter for example comprised between the second and third diameters.

A stretch rod 46 extends inside the duct 34 of the hollow control rod 26, passes through the lower opening 35 and the outlet 4 to assist in the deformation of the preform into a container, as known per se. More particularly, the stretch rod comprises at least one part, namely an upper part 50, which extends in an upper part of the duct 34, and another part, namely a lower part 48, which extends in the lower part of the duct 34. The upper part 50 further protrudes from the upper end of the duct 34, opposite the lower opening 35, in normal use of the injection device, as will be described later. The diameter of the upper part 50 is greater than the diameter of the lower part 48 and the upper part 50 and the lower part are for example joined together by a truncated cone portion 52. The stretch rod 46 is a central rod, substantially centred with respect to the axis of the control rod 26. However, a strict coaxiallity between the stretch rod and the control rod is possible but not required.

The lower part 48 has a substantially constant diameter and extends inside the duct in normal use of the injection device. The diameter of the lower part 48 is substantially equal to the first diameter of the sealing area 36 of the duct 34 and consequently inferior to the second diameter of the second portion 38 of the duct 34. Consequently, in the sealing area 36 and in normal use of the injection device, the lower part 48 of the stretch rod 46 is in punctual liquid tight contact with the duct 34. In the second portion 38 and in the third portion 40 of the duct 34, a space extends around the stretch rod 46.

The diameter of the upper part 50 of the stretch rod is substantially equal to the diameter of the guiding portion 44, such that, in the guiding portion 44 and in normal use of the injection device, the upper part 50 of the stretch rod 46 is in punctual liquid tight contact with the duct 34.

According to the embodiment shown in the figures, the part of the upper part 50 of the stretch rod 40 protruding from the duct 34 extends inside a housing 54, for example attached to the casing 14 above the second upper compartment 30 or made integral with the casing 14. The interior of the housing 54 is isolated from the exterior atmosphere in order to enclose the upper part of the stretch rod 46 in a contamination free environment, for example as disclosed in WO-2011/030183. The housing 54 comprises a lower opening 56, in fluid communication with the duct 34, and an upper opening 58, the function of which will be described later.

According to another embodiment, the upper part of the stretch rod 46 can simply protrude outside the casing 14 without being enclosed in a space isolated from the exterior atmosphere. Such an embodiment simplifies the structure of the injection device but presents greater risks of contamination of the stretch rod.

The stretch rod 46 is movable in translation along axis A in the duct 34 and is actuated by appropriate actuation means. In the embodiments shown in the figures, the actuation means are formed by magnetic means, such that the actuation of the stretch rod 46 can be controlled without any connection between the interior of the housing 54 and the exterior thereof, thereby conserving the isolation of the interior of the housing 54. The magnetic means comprise a first magnet arrangement 60 extending and attached on the upper part 50 of the stretch rod 46, i.e. inside the isolated atmosphere of the interior of the housing 54, and a second magnet arrangement 62 extending on the exterior wall of the housing 54, i.e. outside the isolated atmosphere of the interior of the housing 54. The first magnet arrangement 60 and the second magnet 62 are magnetically coupled together, such that controlling the polarity of the second magnet 62 arrangement allows controlling the movement of the first magnet arrangement 60 and hence the movement of the stretch rod. The first magnet arrangement 60 is for example formed by at least one permanent magnet extending around the stretch rod 46 while the second electromagnet arrangement 62 is for example formed by a electromagnet extending around the housing 54 and connected to control means of the polarity of the electromagnet. Alternatively, the second magnet arrangement 62 could be as disclosed in WO-2011/030183, i.e. a magnet arrangement which is movable axially on the housing, the movement of the second magnet arrangement 62 controlling the movement of the first magnet arrangement 60 and hence of the stretch rod 46.

In normal use of the injection device, meaning when the injection device is used to form containers, the stretch rod 46 is movable in axial translation between a retracted position (shown in FIGS. 1, 4 and 6), wherein the lower part 48 of the stretch rod 46 extends completely inside the duct 34, and an active position, wherein the lower part 48 protrudes from the lower opening 35 of the duct 34 and passes through the outlet 4 in order to assist the axial deformation of a preform. According to a variant, in retracted position, the stretch rod 46 can protrude slightly from the outlet 4. The normal use of the stretch rod 46, in conjunction with the use of the control rod 26 to form containers from preforms, is known and will not be described in greater detail herein.

It should be however noted that in both the retracted position and in the active position and during its movements between these positions, the stretch rod 46 is in liquid tight contact with the duct 34 in the sealing area 36, as shown in FIGS. 1 and 4, thereby preventing the liquid injected in the chamber 6 via the injection means 8 to penetrate inside the duct 34 passed the sealing element 39. By placing the sealing area 36 close to lower opening of the control rod 26, it is possible to limit to a minimum the volume of excess liquid extending outside the formed container in the outlet 4 and in the part of the duct 34 extending below the sealing area 36, when the control rod 26 is placed in its sealing position to stop liquid from being injected through the outlet 4 when the forming of a container is completed. Thereby, when the container is removed from the injection device, the quantity of liquid dripping from the injection device is largely reduced.

Figure 6:
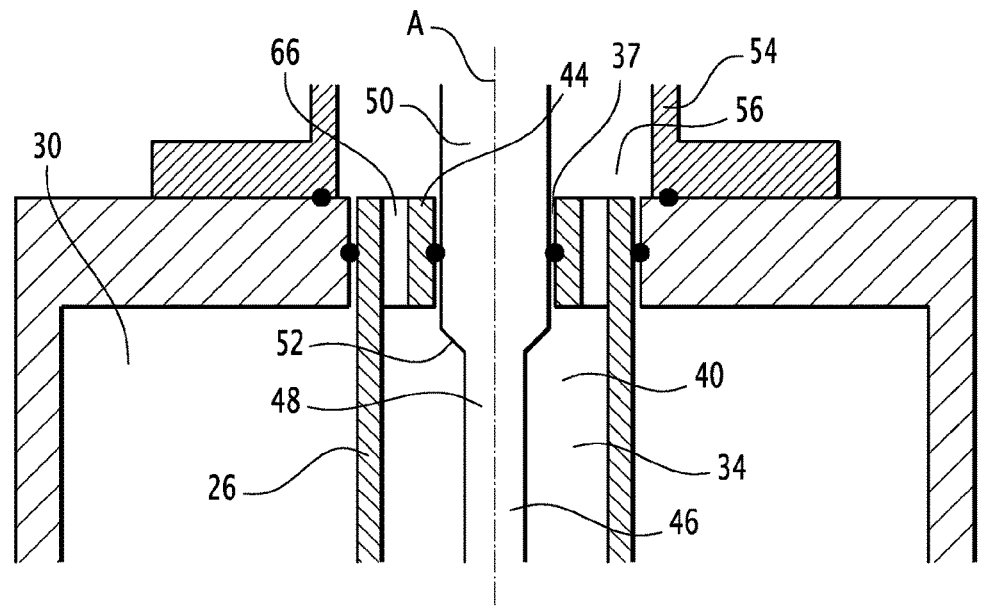
FIG. 6 is an enhanced view of area VI of FIG. 1.

In the embodiment shown in the figures, in normal use, the stretch rod 46 is further in liquid tight contact with the duct in the guiding portion 44, as shown in FIGS. 1 and 6, the guiding portion 44 being arranged to maintain the stretch rod 46 aligned on the axis A during its movements between the retracted and active positions.

Figure 7:
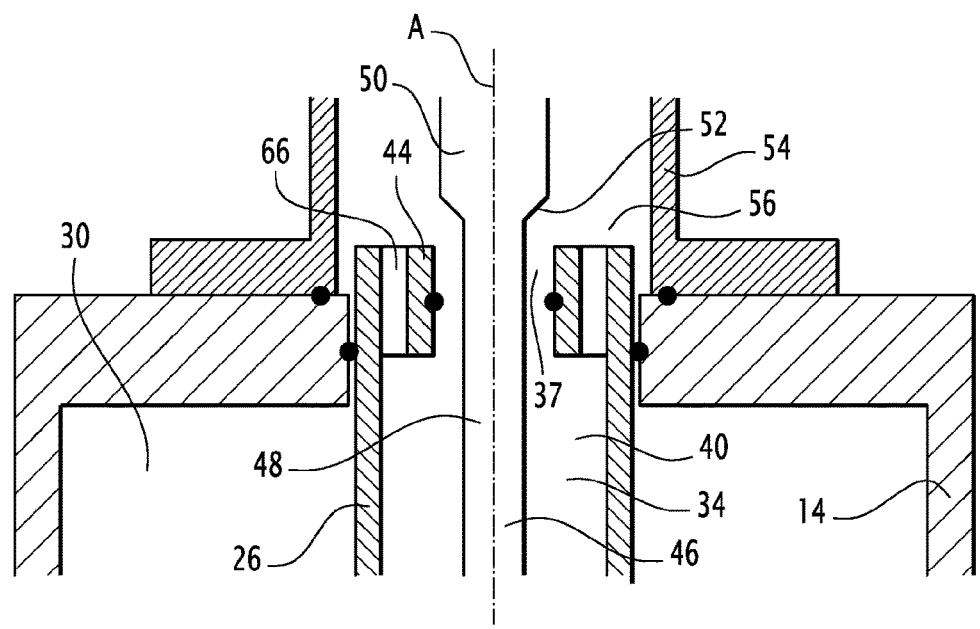
FIG. 7 is an enhanced view of area VII of FIG. 2.

The stretch rod 46 is further movable in a cleaning position, shown in FIGS. 2, 5 and 7, wherein the liquid tight contact(s) between the stretch rod 46 and the duct 34 is (are) removed to allow the liquid injected inside the chamber 6 to penetrate inside the duct 34, as will be described below.

In the cleaning position, the stretch rod 46 is further retracted inside the duct 34 than in the retracted position, such that the lower end of the stretch rod 46 extends above the sealing area 36, i.e. extends in the second portion 38 of the duct where the diameter of the duct is greater than the diameter of the stretch rod 46, as more clearly visible in FIG. 5. Therefore, liquid is allowed to penetrate in the duct 34, via its lower opening 35, to pass the sealing area 36, and to flow inside the duct 34 around the stretch rod 46. Therefore, in the cleaning position, the entire duct 34 is placed in fluidic communication with the chamber 6, whereas between the retracted and active positions, the sealing area 36 of the duct 34 and the part of the duct 34 extending above the sealing area 36 are not in fluidic communication with the chamber 6. Furthermore, in the cleaning position, the stretch rod 46 is retracted such that the lower part 48 of the stretch rod 46 extends in through the guiding portion and in part in the housing 54, as shown in FIG. 7. Consequently, since the diameter of the lower part 48 of the stretch rod is inferior to the diameter of the guiding portion 44, the liquid flowing in the duct 34 is able to penetrate in the housing 54, via its lower opening 56, and to exit the housing 54, via its upper opening 58. In order to improve the flow of liquid passing through the guiding portion 44, one or more channels 64 can be formed in the guiding portion 44 placing the duct in permanent fluidic communication with the lower opening 56 of the housing 54. Furthermore, in order to improve the flow of liquid passing past the first magnet arrangement 60 towards the upper opening 58, one or more channels 66 can be formed in the first magnet arrangement 60 in addition to the space extending between the first magnet arrangement 60 and the wall of the housing 54.

According to a variant, for placing the stretch rod in its cleaning position, the control rod 26 could be moved relative to the stretch rod 46, instead of or in addition to further retracting the stretch rod 46.

The method for cleaning the injection device will now be described.

During cleaning of the injection device, the injection device 1 is connected to means for collecting the products flowing through the injection device 1. These means are for example formed by a "dummy container" 68, placed in fluidic communication with the outlet 4 of the injection device, as shown in FIG. 2. The inlet 2 of the injection device is placed in fluidic communication with a source of cleaning products (not shown), for example a cleaning solution, via the injection means 8. In a known manner, the dummy container 68 can be connected to the source of cleaning products in order to form a close circuit for circulating the cleaning products through the injection device.

The control rod 26 is placed in its injection position and the cleaning products are injected in the chamber 6 via the inlet 2 and the injection means 8. Consequently, the cleaning products flow through the chamber 6, exit the injection device through the outlet 4 and flow inside the dummy container 68, thereby cleaning the fixed part 18 and the movable part 12 of the chamber 6.

Figure 2:
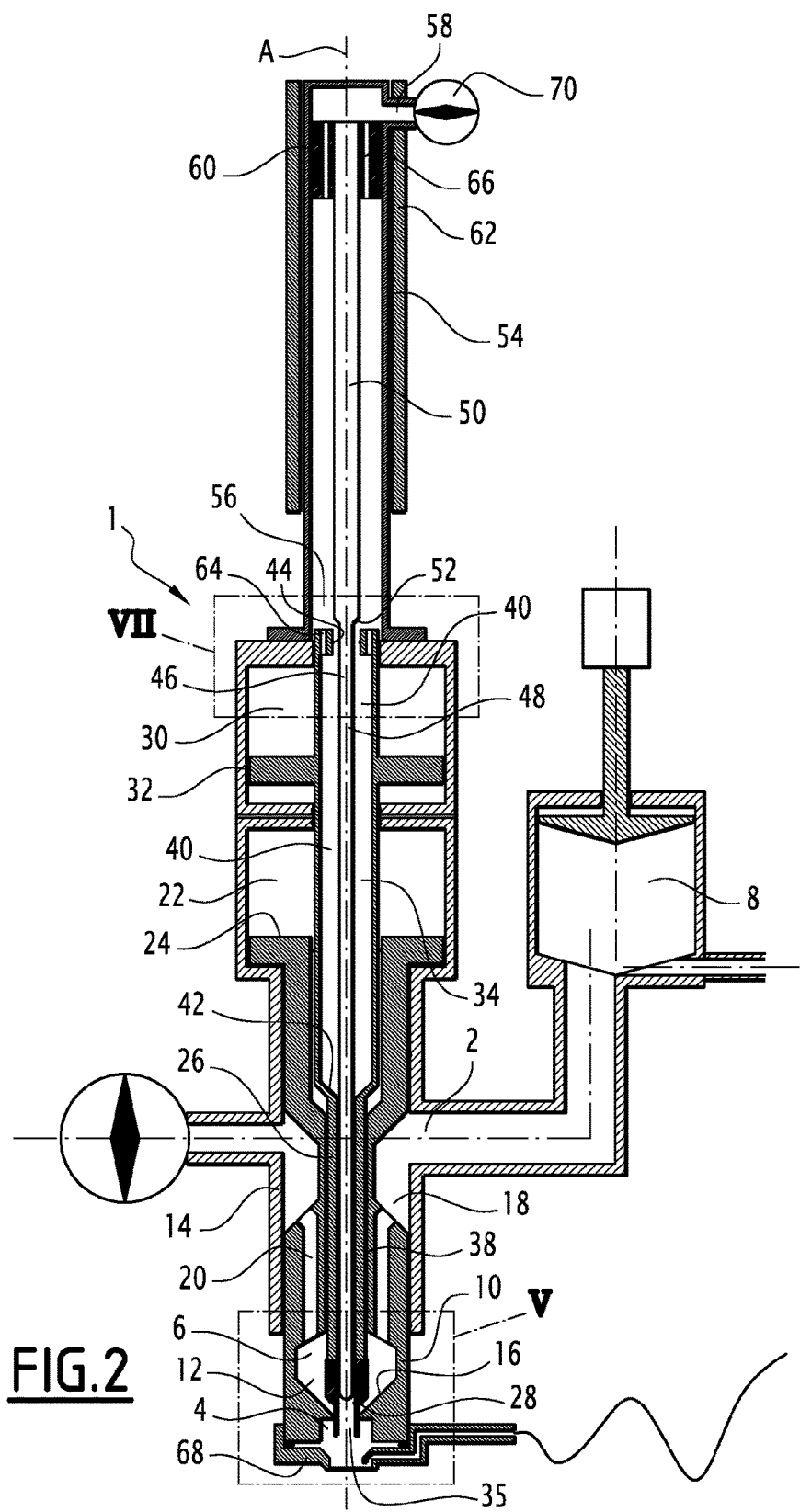
FIG. 2 is a diagrammatical axial cross-section view of the injection device of FIG. 1, during the cleaning of the injection device.

Furthermore, the stretch rod 46 is placed in its cleaning position in order to place the duct 34 in fluidic communication with the chamber 6 when the control rod 26 is placed in its injection position, as shown in FIGS. 2 and 5. Therefore, the cleaning products flowing through the chamber 6 penetrate inside the duct 34 and inside the housing 54 up to the upper opening 58 thereof, which is for example placed in fluidic communication with the source of cleaning products via a control valve 70, which is opened during the cleaning of the injection device.

Consequently, the stretch rod 46 is completely cleaned during the cleaning of the injection device 1 in a single step of injection of the cleaning products through the inlet 2.

Figure 3:
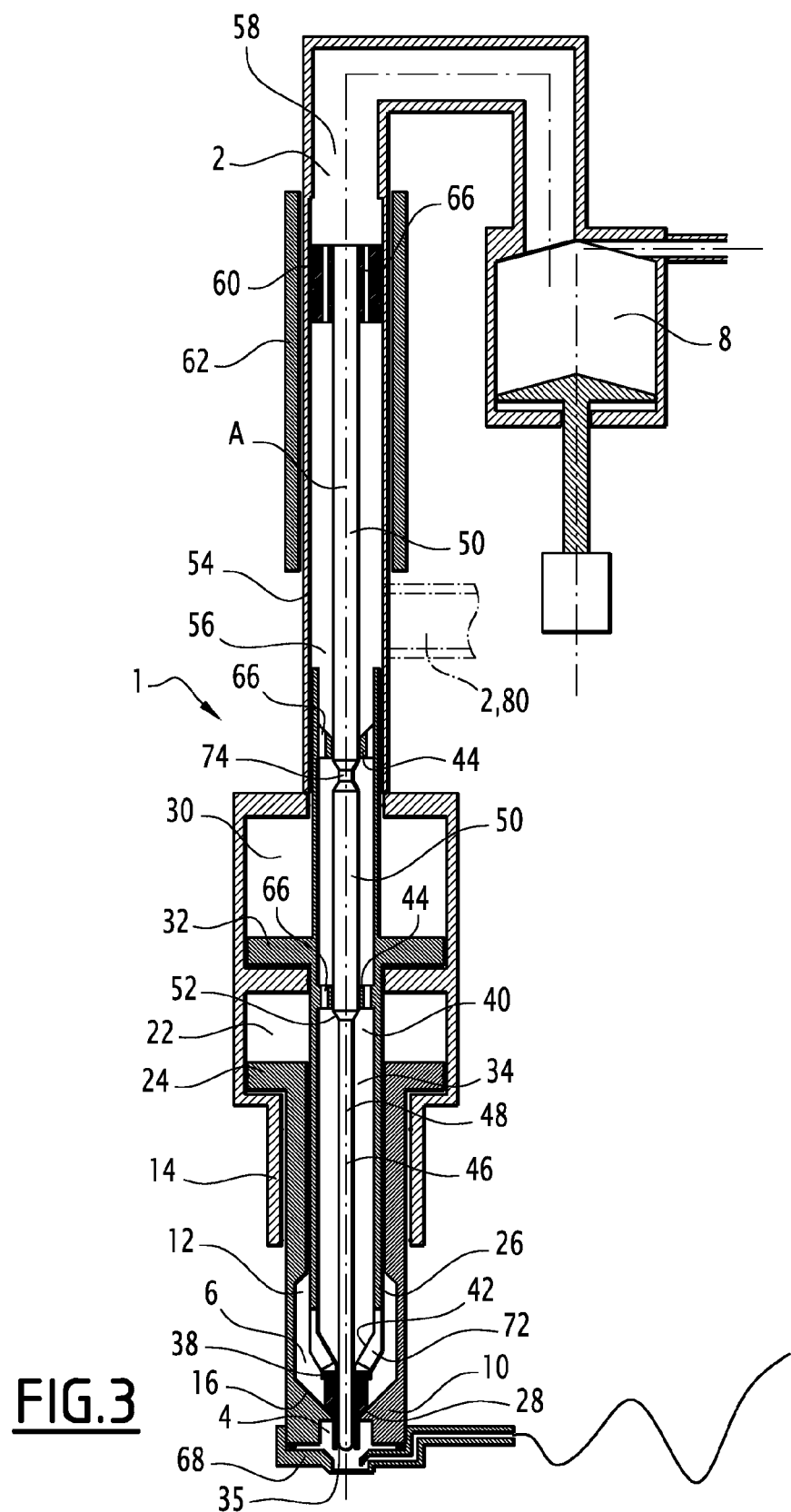
FIG. 3 is a diagrammatical axial cross-section view of an injection device according to a second embodiment of the invention, the control rod being in sealing position and the stretch rod being in retracted position.

In reference to FIG. 3, a second embodiment of the injection device will now be described. In FIG. 3, the elements identical to the elements of the injection device of the first embodiment have the same reference numbers as in the injection device described above.

In the second embodiment, the inlet 2 of the injection device is formed by the upper opening 58 of the housing 54, meaning that the upper opening 58 is connected to the injection means 8. The liquid injected through the inlet 2 reaches the chamber 6 via the duct 34 formed in the control rod 26, the control rod 26 comprising at least one opening 72 placing the duct 34 in fluidic communication with the chamber 6. The opening(s) 72 extend above the sealing area 36 of the duct 34 to prevent the liquid flowing through the duct 34 from exiting the duct 34 via its lower opening 35 in normal use of the injection device. It should be noted that, in this embodiment, the chamber 6 is formed only by its movable part 12. Since the liquid to be injected passes through the duct 34, the diameter thereof is arranged to have a proper flow of liquid, i.e. the diameter of the duct 34 is made larger outside the sealing are 36. In this case, more than one guiding portion 44 is provided inside the duct 34. The stretch rod 46 comprises at least one area of reduced diameter 74 formed in the upper part 50 of the stretch rod 46. The area of reduced diameter 74 is placed opposite the supplementary guiding portion 44 when the stretch rod 46 is placed in its cleaning position.

In normal use, the functioning of the injection device according to the second embodiment is substantially the same as the functioning of the injection device according to the first embodiment, except that the liquid is injected through the upper opening 58 of the housing 54 and flows through the duct 34, via its upper opening 37, into the chamber 6 via opening(s) 72.

During the cleaning of the injection device, the stretch rod 46 and the duct 34 are cleaned for the most part directly by the cleaning products flowing through the upper opening 58 of the housing 54 when the inlet 2 is placed in fluidic communication with the source of cleaning products. The chamber 6 is also cleaned when the cleaning products flow through the opening(s) 72. The part of the duct 34 and the part of the stretch rod 46 extending around the sealing area 36 are cleaned by placing the stretch rod in its cleaning position, thereby allowing the cleaning products passing in the duct to flow in the sealing area 36 and to exit the duct via the lower opening 35 inside the dummy container 68. Consequently, in the cleaning position, the entire duct 34 is placed in fluidic communication with the chamber 6, whereas between the retracted and active positions, the sealing area 36 of the duct 34 is not in fluidic communication with the chamber 6. Therefore, according to this second embodiment, the stretch rod 46 is also completely cleaned during the cleaning of the injection device 1 in a single step of injection of the cleaning products through the inlet 2. The second embodiment is slightly simpler and less cumbersome than the first embodiment, since there is no need to provide an inlet 2 separate from the upper opening 58 of the housing 54. The structure of the control rod 26 is however a little more complex than in the first embodiment.

In a third embodiment (illustrated in dotted line in FIG. 3), the inlet 2 of the injection device is formed in an intermediate area 80 of the housing 54, located axially between the second magnet arrangement 62 and the guiding portion 44. This may improve the independence between the actuation of the stretch rod 46 or of a central rod and the actuation of the injection means 8.

The injection device described above has been described for a hydro forming machine of containers wherein a liquid is used to form the containers. However, the injection device could also be adapted for air blowing machines by replacing the injection of liquid for forming the containers by the injection of air. The cleaning step of the injection device remains the same as what has been previously described.

The injection device could also be adapted for traditional bottle fillers. The stretch rod 46 is replaced by a central rod.

It should be understood that the terms "upper" and "lower", "above" and "under" have been used for an injection device arranged to inject a fluid in a container placed under the injection device. The invention could also be applied in the same manner to an injection device arranged to inject a fluid in a container placed above the injection device. In this case, in the above description, the term "upper" should be exchanged with the term "lower" and the term "above" should be exchanged with the term "under". It should also be understood that the injection device can be used with an axis A which is not vertical. That is for example the case when the injection device is implemented in a station being par of a rotary machine.

The invention claimed is:

1. An injection device for injecting a fluid at an outlet of said device, said device comprising:
   an inlet for receiving the fluid, an outlet for injecting the fluid and a chamber extending between the inlet and the outlet,
   a hollow control rod extending in the chamber and being movable between a sealing position, wherein the control rod closes the outlet, and an injection position, wherein the control rod is arranged away from the outlet, the hollow control rod defining a duct extending through said control rod,
   a central rod extending in the duct of the control rod and movable between a retracted position, wherein the central rod is at least in part retracted inside the duct, and an active position, wherein the central rod protrudes from the control rod and extends through the outlet, the central rod and the duct being arranged to prevent fluidic communication between the duct and the chamber when the central rod moves between its retracted and active positions,
   the central rod and the control rod are further movable relative to each other into a cleaning position, in the cleaning position the duct is in fluidic communication with the chamber such that the fluid flowing in the chamber via the inlet is able to flow inside the duct and around the central rod.

2. The injection device according to claim 1, wherein the central rod is in liquid tight contact with the duct in at least one sealing area when the central rod moves between its retracted and active positions, the central rod being removed from the liquid tight contact when it is in the cleaning position.

3. The injection device according to claim 2, wherein the duct has at least one first diameter in the sealing area, said first diameter being substantially equal to a diameter of a portion of the central rod extending in the sealing area between the retracted and active positions, and wherein the duct has at least one second diameter outside the sealing area, said second diameter being greater than the diameter of said portion of the central rod.

4. The injection device according to claim 2, wherein the duct includes at least one sealing element extending against a wall of the duct in the sealing area.

5. The injection device according to claim 2, wherein the duct comprises a lower opening arranged at one end of the control rod, the lower opening being closed by the central rod in the retracted and in the active positions and being opened by the central rod in the cleaning position, the sealing area located in a vicinity of the lower opening.

6. The injection device according to claim 5, wherein the chamber is in fluidic communication with the duct via the lower opening when the central rod is in the cleaning position.

7. The injection device according to claim 5, wherein the duct further comprises an upper opening arranged at an end of the control rod opposite the lower opening, the duct further including an opening in fluidic communication with the chamber and located between the upper opening and the lower opening of the duct, the fluid flowing in the chamber via the upper opening of the duct and through the opening of the duct placing the duct in fluidic communication with the chamber.

8. The injection device according to claim 1, wherein the duct comprises at least one guiding portion arranged for maintaining the central rod substantially aligned on an axis of the duct.

9. The injection device according to claim 8, wherein the central rod comprises at least one part having a diameter substantially equal to a diameter of the guiding portion, said one part extending at least in the guiding portion when the central rod moves between its retracted and active positions, the central rod further comprising at least one other part having a diameter that is less than the diameter of guiding portion, said other part located at least adjacent to the guiding area when the central rod is in the cleaning position.

10. The injection device according to claim 9, wherein the one part of the central rod is enclosed inside a housing, an interior of said housing being isolated from the exterior atmosphere.

11. The injection device according to claim 10, wherein the central rod includes a first magnet arrangement, the housing comprising a second magnet arrangement magnetically coupled to the first magnet arrangement, the second magnet arrangement extending on an exterior of said housing and being arranged to move the first magnet arrangement and the central rod at least between its retracted and active positions.

12. A station for forming a container from a preform by injecting a liquid in said preform in order to shape the preform into a container, the station comprising an injection device according to claim 1 arranged to inject said liquid in said preform.

13. A method for cleaning an injection device according to claim 1, comprising the following steps:
   placing the inlet of the injection device in fluidic communication with a source of cleaning product and placing the outlet in fluidic communication with a collector that receives the cleaning products,
   placing the control rod in its injection position,
   injecting said cleaning products in the chamber via the inlet, said cleaning products being evacuated via the outlet,
   wherein when the central rod in placed in the cleaning position, the cleaning products injected via the inlet are able to flow within the entire duct of the control rod and around the central rod.

* * * * *